US012393074B2

(12) United States Patent
Wu et al.

(10) Patent No.: US 12,393,074 B2
(45) Date of Patent: Aug. 19, 2025

(54) DIMMING DEVICES WITH PIXELATED LIQUID CRYSTAL PHYSICAL GELS

(71) Applicant: Meta Platforms Technologies, LLC, Menlo Park, CA (US)

(72) Inventors: Xi Wu, Redmond, WA (US); Nicholas John Diorio, Jr., Duvall, WA (US); Gareth John Valentine, Kirkland, WA (US); Kai-Han Chang, Troy, MI (US); Chenrun Feng, Kent, OH (US); Afsoon Jamali, Issaquah, WA (US); Francis Lawrence Leard, Sudbury, MA (US); Jasmine Soria Sears, Portland, OR (US); Olga Vladimirovna Barykina-Tassa, San Mateo, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/516,863

(22) Filed: Nov. 21, 2023

(65) Prior Publication Data
US 2024/0184157 A1 Jun. 6, 2024

Related U.S. Application Data

(60) Provisional application No. 63/426,972, filed on Nov. 21, 2022.

(51) Int. Cl.
*G02F 1/1334* (2006.01)
*G02F 1/1343* (2006.01)

(52) U.S. Cl.
CPC .... *G02F 1/13345* (2021.01); *G02F 1/134309* (2013.01)

(58) Field of Classification Search
None
See application file for complete search history.

(56) References Cited

U.S. PATENT DOCUMENTS

| 2003/0160213 A1* | 8/2003 | Kato | C09K 19/54 |
| | | | 252/299.63 |
| 2010/0328594 A1* | 12/2010 | Ishii | G09G 3/3688 |
| | | | 349/139 |
| 2013/0208342 A1* | 8/2013 | Chen | G02F 1/172 |
| | | | 359/296 |
| 2016/0017228 A1* | 1/2016 | Chao | C09K 19/586 |
| | | | 428/1.1 |

(Continued)

OTHER PUBLICATIONS

N. Mizoshita, et al., Advanced Materials, vol. 11, No. 5, pp. 392-394, "Self-Aggregation of an Amino Acid Derivatives as a Route to Liquid-Crystalline Physical Gels-Faster Response to Electric Fields", 1999.*

(Continued)

*Primary Examiner* — Ryan Crockett
(74) *Attorney, Agent, or Firm* — Greenberg Traurig, LLP

(57) ABSTRACT

An optical device includes a first set of one or more electrodes, a second set of one or more electrodes distinct and separate from the first set of one or more electrodes, and a medium that includes liquid crystal physical gel. The medium is located between the first set of one or more electrodes and the second set of one or more electrodes. The optical device may operate as an optical dimming device, which may be used in head-mounted display devices or as dimmable windows or shutters.

17 Claims, 9 Drawing Sheets

(56) References Cited

U.S. PATENT DOCUMENTS

| | | | | |
|---|---|---|---|---|
| 2016/0125819 A1* | 5/2016 | Zhang | ............... | G02F 1/134336 |
| | | | | 349/20 |
| 2020/0349902 A1* | 11/2020 | Machida | ............ | G02B 27/0101 |
| 2022/0003038 A1* | 1/2022 | Chen | ........................ | G02F 1/163 |
| 2024/0077779 A1* | 3/2024 | Wu | ......................... | G02F 1/155 |
| 2024/0377684 A1* | 11/2024 | Jamali | ................... | G02F 1/1347 |

OTHER PUBLICATIONS

N. Mizoshita, et al., Displays, vol. 22, pp. 33-37, "Nematic Liquid-Crystalline Physical Gels Exhibiting Faster Responses to Electric Fields in Twisted Nematic Cells", 2001.*

Mizoshita et al., "Fast and High-Contrast Electro-Optical Switching of Liquid-Crystalline Physical Gels" Formation of Oriented Microphase-Separated Structures, Adv. Funct. Mater., vol. 13, No. 4, Apr. 2003, pp. 313-317.*

* cited by examiner

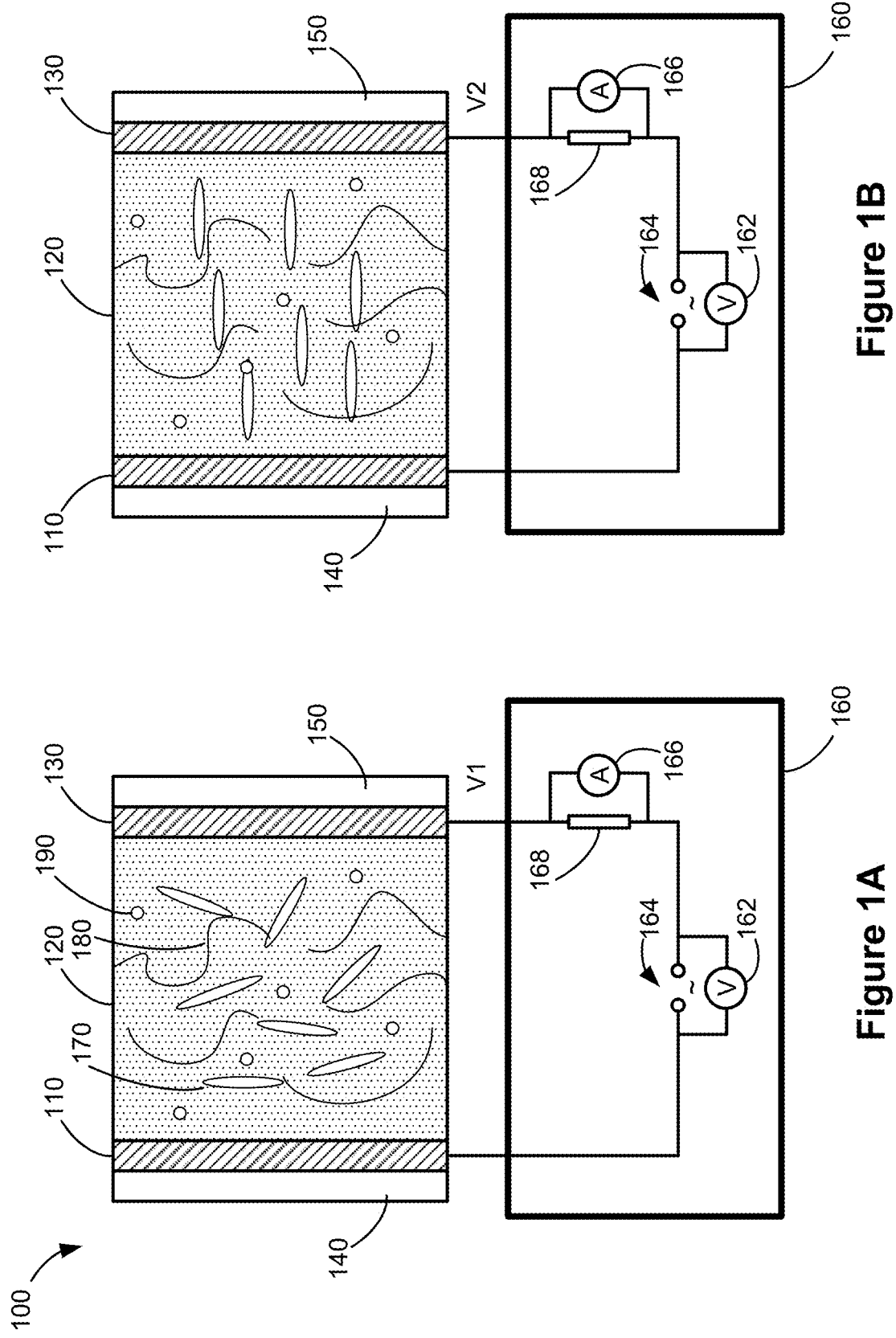

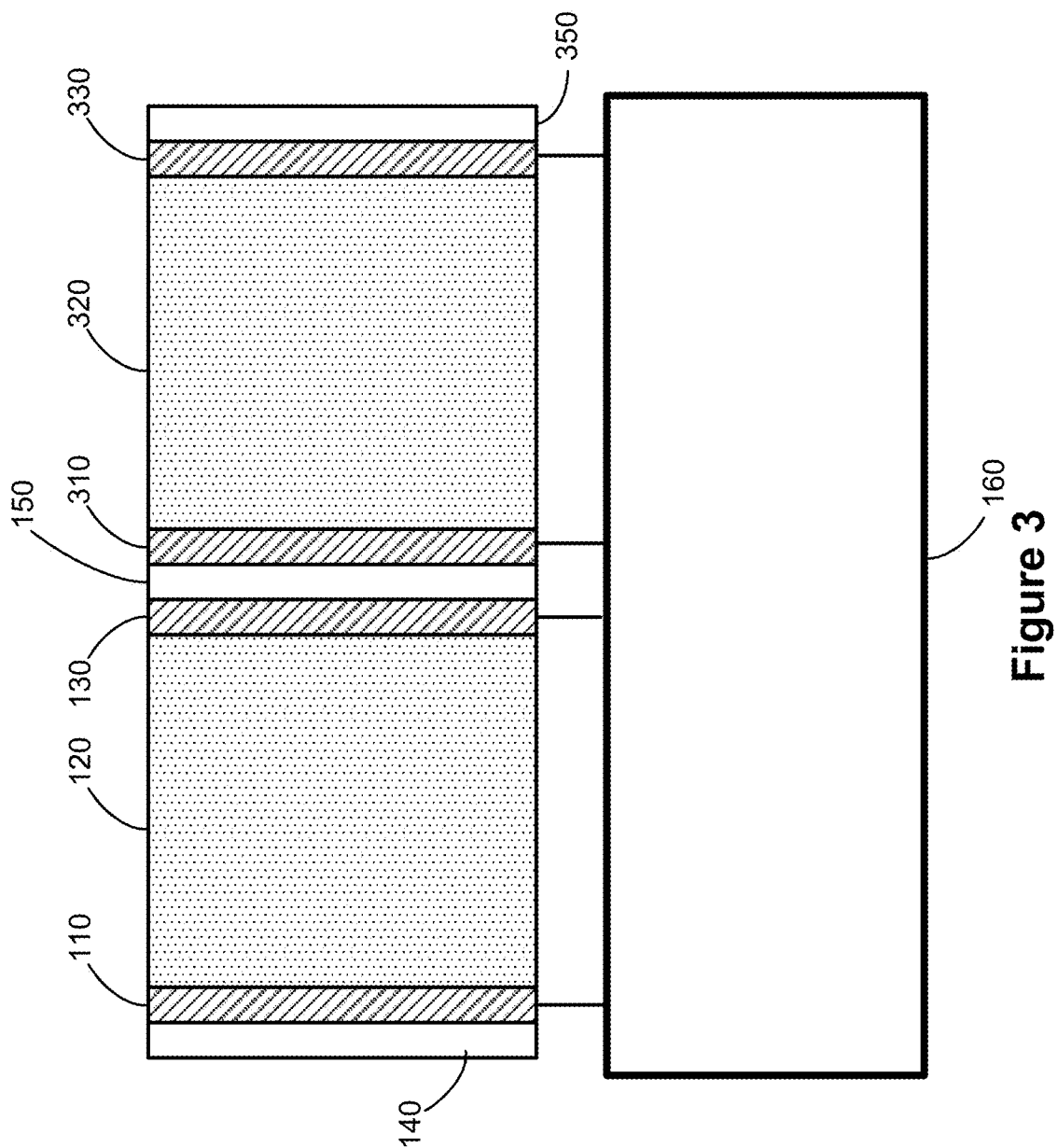

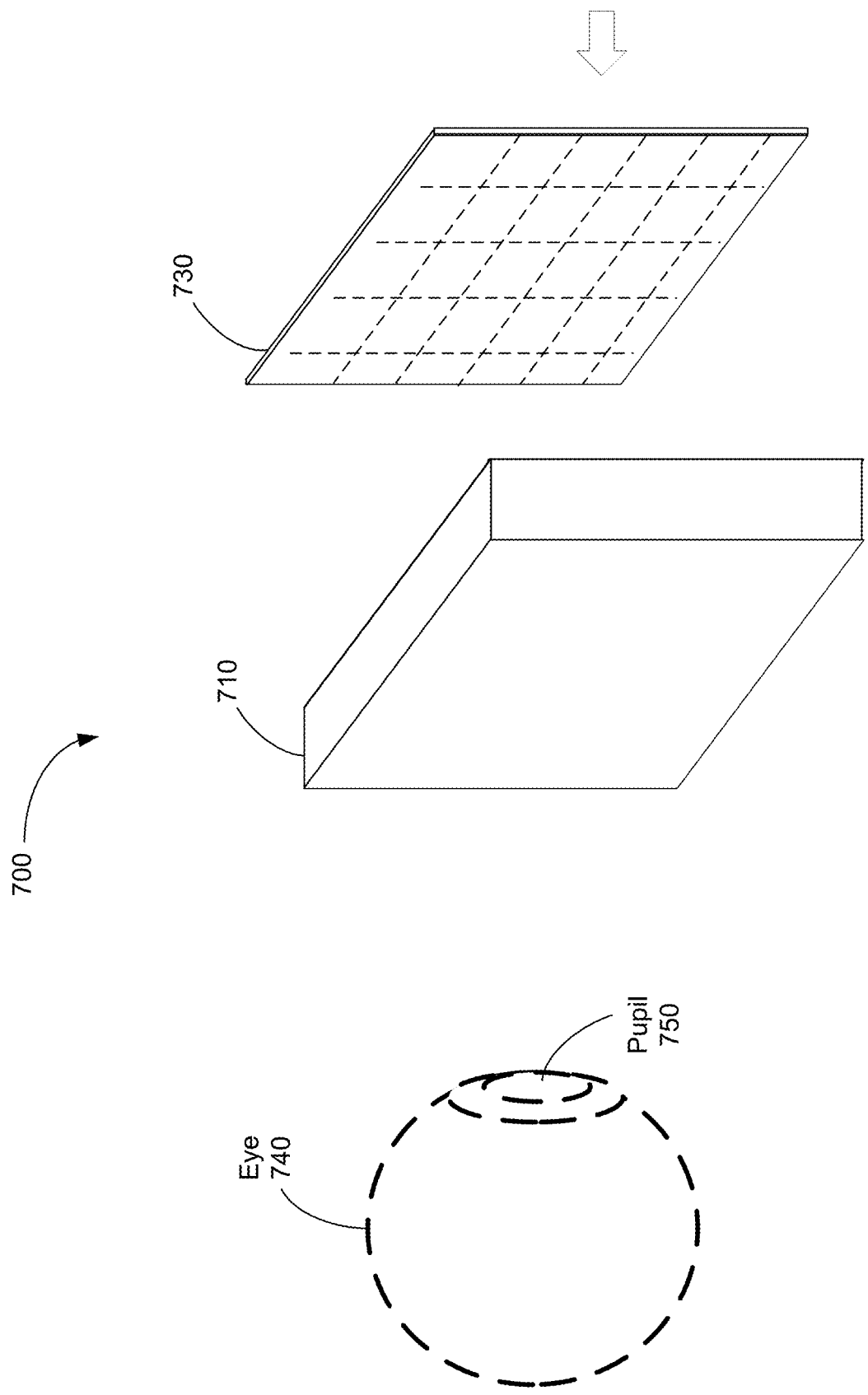

DIMMING DEVICES WITH PIXELATED LIQUID CRYSTAL PHYSICAL GELS

RELATED APPLICATIONS

This application claims the benefit of, and priority to, U.S. Provisional Patent Application Ser. No. 63/426,972, entitled "Dimming Devices with Pixelated Liquid Crystal Physical Gels" filed Nov. 21, 2022, which is incorporated by reference herein in its entirety.

TECHNICAL FIELD

The present disclosure relates generally to optical devices and, more specifically, to optical devices with liquid crystal physical gels.

BACKGROUND

Electro-optic devices are widely used in optical applications. By providing the ability to modulate light based on applied electrical signals, electro-optic devices can be used, for example, to switch on or off transmission of light. Additionally or alternatively, electro-optic devices can be used to modify optical properties of light, such as polarization or spectral power distribution.

SUMMARY

However, there is a need for lowering an electrical input required for switching the electro-optic device (e.g., from an "on" state to an "off" state or from the "off" state to the "on" state).

This application describes optical devices that utilize liquid crystal physical gels for lowering the electrical input. This can reduce or eliminate the need for a high voltage driving circuit, thereby reducing the cost, weight, and size of the electro-optic device. In addition, this can increase the switching speed. In some cases, this can reduce the electrical power consumption.

In accordance with some embodiments, an optical device includes a first set of one or more electrodes; a second set of one or more electrodes distinct and separate from the first set of one or more electrodes; and a medium that includes liquid crystal physical gel. The medium is located between the first set of one or more electrodes and the second set of one or more electrodes.

In some embodiments, the optical device further includes a first substrate on which the first set of one or more electrodes is located; and a second substrate on which the second set of one or more electrodes is located, the second substrate being distinct and separate from the first substrate.

In some embodiments, the first set of one or more electrodes is positioned on the first substrate facing toward the second set of one or more electrodes; and the second set of one or more electrodes is positioned on the second substrate facing toward the first set of one or more electrodes.

In some embodiments, the first set of one or more electrodes consists of a single electrode.

In some embodiments, the second set of one or more electrodes consists of a single electrode.

In some embodiments, the second set of one or more electrodes includes a plurality of pixelated electrodes.

In some embodiments, the first set of one or more electrodes includes a plurality of pixelated electrodes.

In some embodiments, the second set of one or more electrodes consists of a single electrode.

In some embodiments, the second set of one or more electrodes includes a plurality of pixelated electrodes.

In some embodiments, the liquid crystal physical gel includes liquid crystals.

In some embodiments, the liquid crystal physical gel includes a gelator selected from a group consisting of: cholesteryl stearate, polyfluorene-based polymer, a combination of a fatty acid and mesogen monomer, or a side-chain liquid crystalline polymer.

In some embodiments, a concentration of the gelator is less than 2% weight.

In some embodiments, one or more electronic controllers for providing a first set of electrical inputs to the first set of one or more electrodes and the second set of one or more electrodes at a first time and a second set of electrical inputs to the first set of one or more electrodes and the second set of one or more electrodes at a second time distinct from the first time so that the optical device has a first transmission pattern at the first time and a second transmission pattern distinct from the first transmission pattern at the second time.

In some embodiments, the medium is included in a stack of two or more distinct compartments. A first compartment of the stack of two or more distinct compartments is positioned adjacent to the first set of one or more electrodes. A second compartment of the stack of two or more distinct compartments is positioned adjacent to the second set of one or more electrodes.

In some embodiments, the liquid crystal physical gel includes one or more dyes.

In accordance with some embodiments, a display device includes one or more display panels; and any optical device described herein. In some embodiments, the optical device is positioned to receive light and conditionally provide at least a portion of the light to the one or more display panels.

In accordance with some embodiments, a method includes providing a first set of electrical inputs to the first set of one or more electrodes and the second set of one or more electrodes of any optical device described herein at a first time so that the optical device has a first transmission pattern; and providing a second set of electrical inputs to the first set of one or more electrodes and the second set of one or more electrodes at a second time distinct from the first time so that the optical device has a second transmission pattern distinct from the first transmission pattern.

In some embodiments, the first transmission pattern has a higher optical transmittance than the second transmission pattern.

In some embodiments, the first set of electrical inputs has a higher voltage than the second set of electrical inputs.

In some embodiments, the first set of electrical inputs has a characteristic voltage less than 1 V.

In some embodiments, the first set of electrical inputs is characterized by an electrical field less than 0.1 V/µm.

In some embodiments, the first set of electrical inputs is characterized by an electrical field less than 0.1 V/µm; and the second set of electrical inputs is characterized by an electrical field less than 0.1 V/µm.

The disclosed optical devices and methods may replace conventional optical devices and methods. The disclosed optical devices and methods may complement conventional optical devices and methods.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 1A and 1B are schematic diagrams illustrating different states of an optical device in accordance with some embodiments.

FIG. 3 is a schematic diagram illustrating an optical device in accordance with some embodiments.

FIG. 7 is an isometric view of a display device in accordance with some embodiments.

Figure 2A:
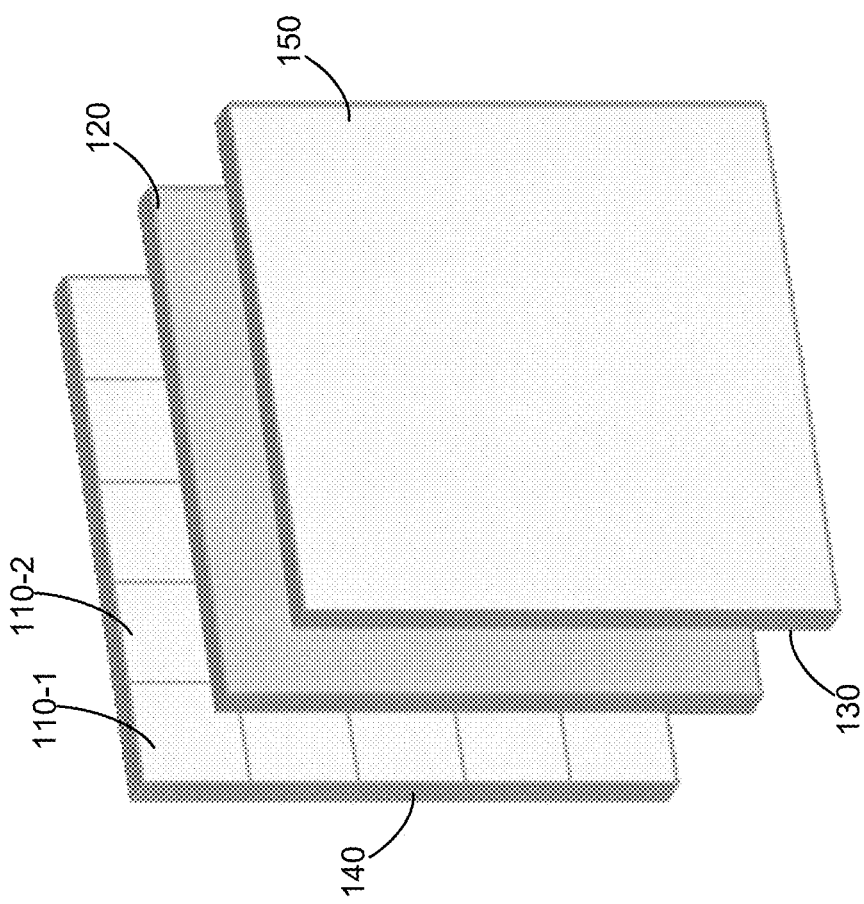
FIG. 2A is a schematic diagram illustrating an optical device in accordance with some embodiments.

These figures are not drawn to scale unless indicated otherwise.

DETAILED DESCRIPTION

As described above, conventional electro-optic devices require a high voltage electrical input. The electro-optic devices described herein reduce or eliminate the need for the high voltage electrical input.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIGS. 1A and 1B are schematic diagrams illustrating different states of an electro-optic device 100 in accordance with some embodiments.

The electro-optic device 100 includes a first electrode 110. The first electrode 110 may provide an electrical field to a medium 120 located adjacent to the first electrode 110.

FIG. 1A also shows that the electro-optic device 100 includes a second electrode 130. In some embodiments, the second electrode 130 is distinct and separate from the first electrode 110.

FIG. 1A shows that the electro-optic device 100 also includes a first substrate 140. In some embodiments, the first substrate 140 is located adjacent to the first electrode 110 (e.g., the first electrode 110 is located adjacent to the first substrate 140).

FIG. 1A also shows that the electro-optic device 100 further includes a second substrate 150. In some embodiments, the second substrate 150 is located adjacent to the second electrode 130 (e.g., the second electrode 130 is also located adjacent to the second substrate 150). In some embodiments, the second substrate 150 is distinct and separate from the first substrate 140. This allows the first substrate 140 and the second substrate 150 to define a cavity (also called a compartment or liquid crystal cell) between the first substrate 140 and the second substrate 150. In some embodiments, the distance between the first substrate 140 and the second substrate 150 is 1 µm, 2 µm, 3 µm, 4 µm, 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, 20 µm, 25 µm, 30 µm, 35 µm, 40 µm, 45 µm, 50 µm, 55 µm, 60 µm, 65 µm, 70 µm, 75 µm, 80 µm, 85 µm, 90 µm, 95 µm, or 100 µm, or within an interval between any two of the forementioned distances. In some embodiments, the distance between the first substrate 140 and the second substrate 150 is greater than 100 µm. As shown in FIG. 1A, in some configurations, the medium 120 is located in the cavity (e.g., between the first substrate 140 and the second substrate 150).

The medium 120 includes a liquid crystal physical gel (also called a liquid-crystalline physical gel). In some embodiments, the liquid crystal physical gel includes a liquid crystal 170 and a gelator 180.

In some embodiments, the liquid crystal 170 includes a nematic liquid crystal (e.g., 4-cyano-4'-pentylbiphenyl, 4-pentyl-4'-cyanobiphenyl, HTW106700-100, or HFW59200-200).

In some embodiments, the liquid crystal physical gel includes cholesteryl stearate. In some embodiments, the cholesteryl stearate is represented by:

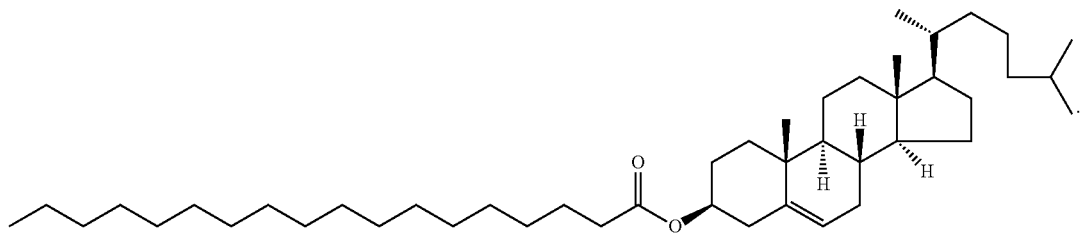

In some embodiments, the liquid crystal physical gel is formed as a self-assembly of cholesteryl stearate in a mixture with nematic liquid crystals.

In some embodiments, the liquid crystal physical gel includes polyfluorene-based polymer (e.g., polyfluorene-based π-conjugated polymer, such as poly(9,9-dioctyl-fluorene-alt-benznidazole)). In some embodiments, the polyfluorene-based polymer includes a fluorine unit represented by:

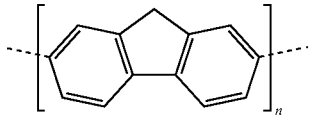

In some embodiments, the fluorene unit includes one or more side chains, for example, as shown below:

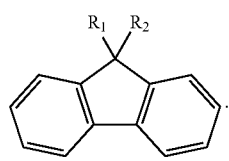

In some embodiments, the liquid crystal physical gel is formed as a fibrous self-assembly of polyfluorene-based polymer in a mixture with nematic liquid crystals.

In some embodiments, the liquid crystal physical gel includes a combination of fatty acid (e.g., 12-hydroxydodecanoic acid) and mesogen (e.g., mesogen monomer, such as RM257). In some embodiments, the mesogen is selected from a group consisting of RM006, RM010, RM021, RM82, RM105, or RM257. In some embodiments, RM257 is represented by:

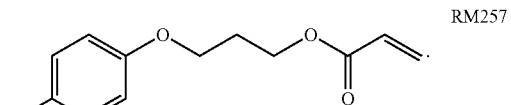
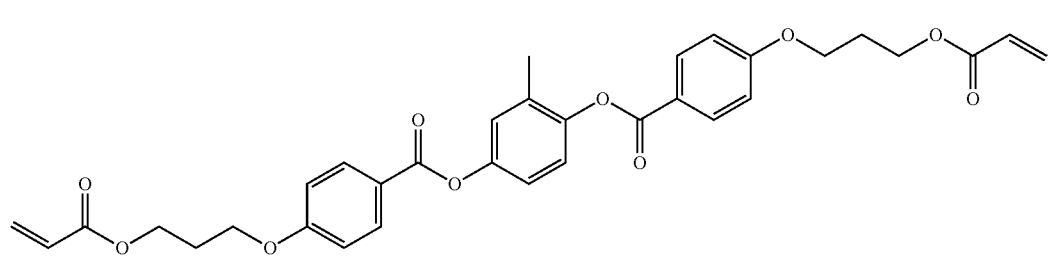

In some embodiments, the liquid crystal physical gel is formed as a fibrous self-assembly of the fatty acid (e.g., 12-hydroxydodecanoic acid) and mesogen monomer (e.g., RM257) in a mixture with nematic liquid crystals.

In some embodiments, the liquid crystal physical gel includes side-chain liquid crystalline polymer (SCLCP). In some embodiments, the SCLCP includes a spacer. In some embodiments, the spacer includes poly[ω-4'-cyano-(1,1'-biphenyl)]acrylate.

In some embodiments, the liquid crystal physical gel is formed as a self-assembly of the SCLCP with poly[ω-4'-cyano-(1,1'-biphenyl)]acrylate in a mixture with nematic liquid crystals.

In some embodiments, the electro-optic device 100 is electrically coupled with an electrical source 160. The electrical source 160 may provide a voltage or current to the electro-optic device 100 (e.g., across or between the first electrode 110 and the second electrode 130). For example, in some embodiments, the first electrode 110 and the second electrode 130 are electrically coupled with the electrical source 160. In some embodiments, the electro-optic device 100 includes the electrical source 160. In some embodiments, the electrical source 160 is not part of the electro-optic device 100.

As shown in FIG. 1A, in some embodiments, the electrical source 160 includes one or more voltage sources 162 and 164. In some embodiments, the electrical source 160 includes one or more current sources 166. In some embodiments, the electrical source 160 includes one or more voltage sources 162 and 164 and one or more current sources 166. In some embodiments, the electrical source 160 includes one or more voltage sources 162 and 164 without one or more current sources 166. In some embodiments, the electrical source 160 includes one or more current sources 166 without one or more voltage sources 162 and 164.

In some embodiments, the electrical source 160 includes an electrical power storage (e.g., a battery or a capacitor).

As shown in FIG. 1A, in some embodiments, the one or more current sources 166 are electrically connected in parallel to one or more impedances 168 (e.g., resistors). In some embodiments, one or more current sources are electrically connected in series.

As shown in FIG. 1A, in some embodiments, the one or more voltage sources 162 and 164 are electrically connected in parallel (e.g., the voltage source 162 is electrically connected in parallel to the voltage source 164). In some embodiments, the one or more voltage sources 162 and 164 include a direct-current voltage source. In some embodiments, the one or more voltage sources 162 and 164 include an alternating-current voltage source (or a dynamic voltage source that provides voltages in a non-sinusoidal pattern). In some embodiments, the one or more voltage sources 162 and 164 include both a direct-current voltage source and an alternating-current voltage source (or a dynamic voltage source).

FIG. 1A also illustrates that the electrical source 160 provides a first electrical input V1 (e.g., a zero-voltage input or an electrical input below a predefined electrical threshold, such as a voltage threshold) across the first electrode 110 and the second electrode 130. Such electrical input does not cause alignment of the liquid crystals 170. As a result, the electro-optic device 100 may have a first transmittance.

FIG. 1B illustrates that the electrical source 160 provides a second electrical input V2 (e.g., a non-zero voltage input or an electrical input above a predefined electrical threshold, such as a voltage threshold) across the first electrode 110 and the second electrode 130. Such electrical input causes alignment of the liquid crystals 170. As a result, the electro-optic device 100 may have a second transmittance distinct from the first transmittance.

In some embodiments, the first transmittance corresponds to a low transmittance and the second transmittance corresponds to a high transmittance. In some embodiments, the first transmittance corresponds to a high transmittance and the second transmittance corresponds to a low transmittance.

In some embodiments, the switching is reversible. Thus, in some configurations, subsequent to aligning the liquid crystals 170, providing the first electrical input V1 or another electrical input V3 (e.g., a zero-voltage input or an electrical input below a predefined electrical threshold, such as a voltage threshold) across the first electrode 110 and the second electrode 130 allows the liquid crystals 170 to move away from the alignment. As a result, the electro-optic device 100 may return to have the first transmittance.

Thus, changing or alternating the electrical input provided across the first electrode 110 and the second electrode 130 allows the electro-optic device 100 to operate as a controllable dimming device.

Although FIGS. 1A and 1B illustrate two states of the electro-optic device 100, the electro-optic device 100 may operate in more than two states. For example, a voltage between V1 and V2 may be provided across the first electrode 110 and the second electrode 130 to provide a transmittance (e.g., a medium transmittance) between the first transmittance associated with V1 and the second transmittance associated with V2.

In some embodiments, the medium 120 (or the liquid crystal physical gel) also includes one or more dyes 190. In some embodiments, the one or more dyes 190 include a non-dichroic dye. In some embodiments, the one or more dyes 190 include a dichroic dye. This allows the optical device to provide tunable colors (a first color at a first time and a second color distinct from the first color at a second time mutually exclusive from the first time). In some embodiments, the one or more dyes 190 include a combination of a non-dichroic dye and a dichroic dye. In some embodiments, the non-dichroic dye provides a permanent color tint. In some embodiments, the dichroic dye provides color tints that change with the applied electric field (and/or the orientation of the liquid crystals). In some embodiments, the one or more dyes 190 (e.g., a dichroic dye and/or a non-dichroic dye) reduce the transparency while the optical device is in a dark state.

Figure 2B:
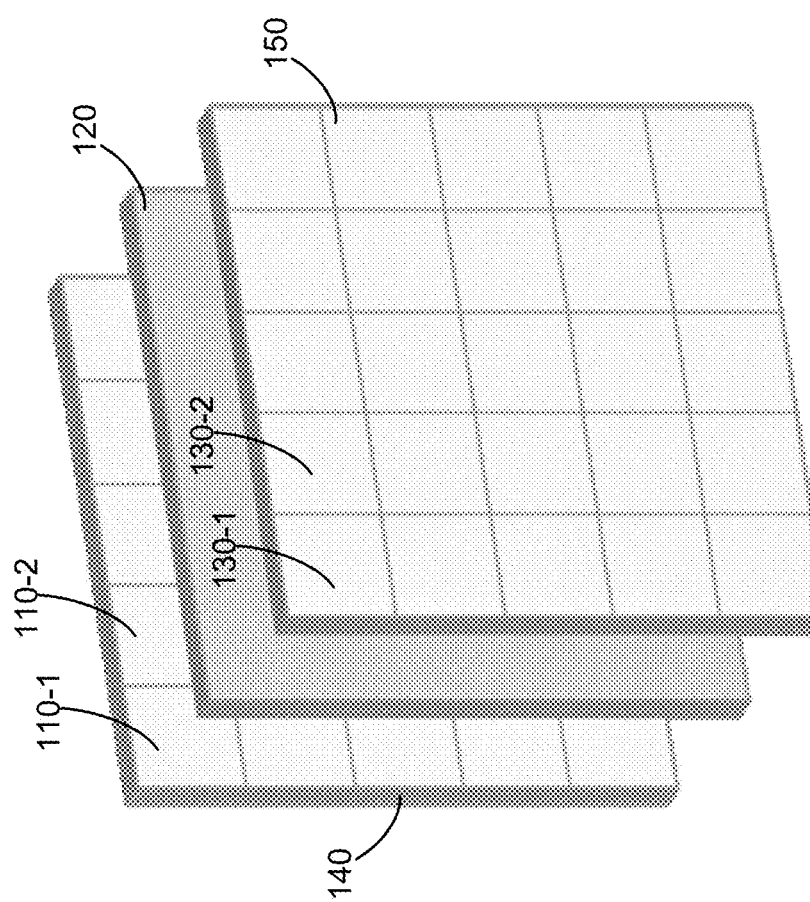
FIG. 2B is a schematic diagram illustrating an optical device in accordance with some embodiments.
Figure 2C:
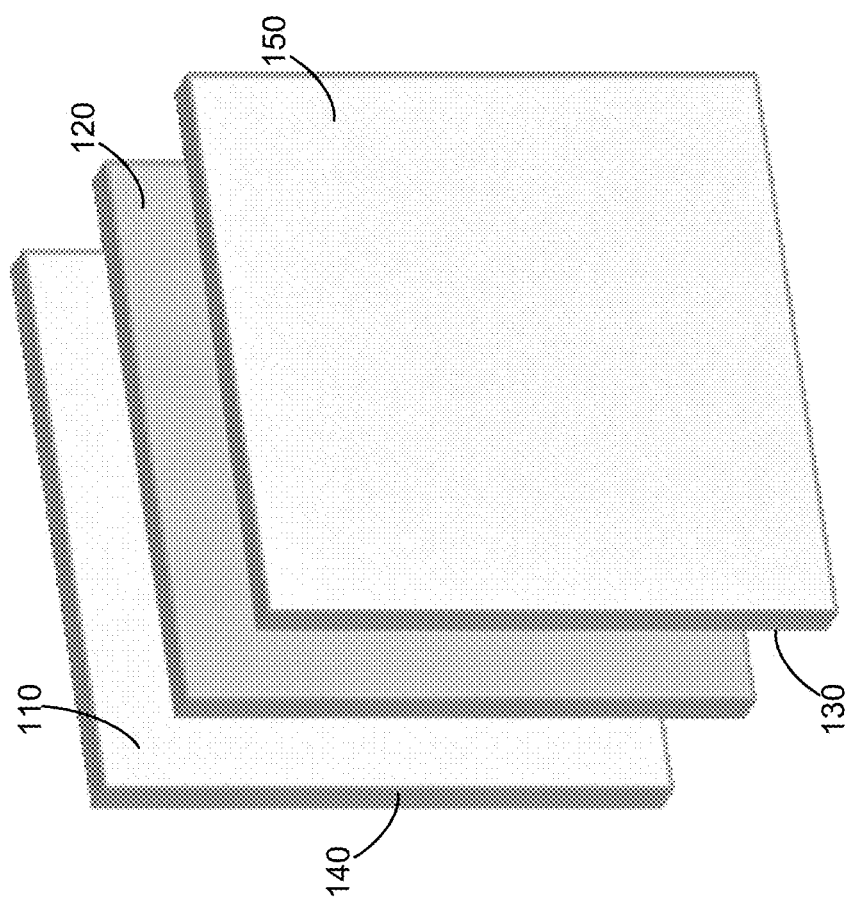
FIG. 2C is a schematic diagram illustrating an optical device in accordance with some embodiments.

FIGS. 2A-2C illustrate optical devices in exploded views to show components and operations of such optical devices with clarity. Certain aspects of such optical devices are omitted so as not to obscure other aspects of such optical devices.

FIG. 2A is a schematic diagram illustrating an optical device in accordance with some embodiments.

The optical device shown in FIG. 2A includes a first set of one or more electrodes (e.g., a plurality of pixelated working electrodes 110-1 and 110-2) and a second set of one or more electrodes (e.g., a single counter electrode 130 with a size substantially corresponding to the plurality of pixelated working electrodes).

The optical device also includes the medium 120 that includes a liquid crystal physical gel located between the first set of one or more electrodes (e.g., the working electrodes 110-1 and 110-2) and the second set of one or more electrodes (e.g., the counter electrode 130).

In some embodiments, each working electrode of the plurality of pixelated working electrodes has a size of 1 mm×1 mm, although the working electrode may have a different size or shape (e.g., the working electrode may be bigger or smaller, wider or narrower, taller or shorter, and may have a square shape, a non-square rectangular shape, or any other shape).

In some embodiments, the first set of one or more electrodes 110 is formed on, or over, a substrate 140. In some embodiments, the substrate 140 is made of, or includes, an optically transparent material, such as glass or optically transparent plastic (e.g., polyethylene terephthalate (PET)).

In some embodiments, the second set of one or more electrodes 130 is formed on, or over, a substrate 150. In some embodiments, the substrate 150 is made of, or includes, an optically transparent material, such as glass or optically transparent plastic (e.g., polyethylene terephthalate (PET)).

In some embodiments, the first set of one or more electrodes 110 is made of, or includes, transparent conducting oxide (TCO), such as indium tin oxide (ITO), fluorine doped tin oxide (FTO), or fluorine doped zinc oxide (FZO).

In some embodiments, the second set of one or more electrodes 130 is made of, or includes, transparent conducting oxide (TCO), such as indium tin oxide (ITO), fluorine doped tin oxide (FTO), or fluorine doped zinc oxide (FZO).

In some embodiments, applying a first set of electrical inputs to the first set of one or more electrodes and the second set of one or more electrodes (e.g., a positive or negative potential with respect to the working electrodes) causes the liquid crystals in the medium 120 to align (e.g., in a direction substantially perpendicular to the substrate 140 or the substrate 150). This, in turn, modifies light transmitted through the optical device (e.g., by changing reflectivity and/or transmission of light).

In some embodiments, the first set of electrical inputs provides (or applies) different voltages to at least one electrode of the first set of one or more electrodes). For example, in some cases, the voltage applied to the electrode 110-1 and the voltage applied to the electrode 110-2 (relative to the electrode 130) are different (e.g., a voltage above a voltage threshold is applied to the electrode 110-1 and a voltage below the voltage threshold is applied to the electrode 110-2). This allows a pixel corresponding to the electrode 110-1 and a pixel corresponding to the electrode 110-2 to have different transmittances, thereby providing the dimming effect over only a certain region (e.g., a subset, less than all, of a cross-section of the optical device) rather than the entire region. However, the configuration shown in FIG. 2A is also capable of providing the dimming effect over the entire region of the cross-section of the optical device.

FIG. 2B illustrate an optical device that is similar to the optical device illustrated in FIG. 2A, except that the optical device illustrated in FIG. 2B includes a plurality of pixelated electrodes as the second set of one or more electrodes (e.g., both the first set of one or more electrodes 110-1 and 110-2 and the second set of one or more electrodes include a plurality of pixelated electrodes 130-1 and 130-2). Similar to the optical device illustrated in FIG. 2A, the plurality of pixelated working electrodes in the optical device illustrated in FIG. 2B allows dimming in one or more portions, less than all, of a cross-section of the optical device (e.g., local dimming).

FIG. 2C illustrate an optical device that is similar to the optical device illustrated in FIG. 2A, except that the optical device illustrated in FIG. 2C includes a single electrode as the first set of one or more electrodes (e.g., a single working electrode) and a single electrode as the second set of one or more electrodes (e.g., a single counter electrode). The use of the single working electrode allows (concurrent) dimming across the entire cross-section of the optical device (e.g., global dimming).

FIG. 3 is a schematic diagram illustrating an optical device in accordance with some embodiments.

The optical device illustrated in FIG. 3 is similar to the optical device shown in FIGS. 1A and 1B, except that the optical device shown in FIG. 3 includes a second cavity (also called a compartment or liquid crystal cell) defined between the substrate 150 and a substrate 350 for containing a medium 320. In some embodiments, the medium 320 and the medium 120 have a same composition. In some embodiments, the medium 320 and the medium 120 have different compositions (e.g., the medium 320 and the medium 120 may have different liquid crystals or gelators). An electrical field is applied to the medium 320 by electrodes 320 and 330, which are electrically coupled with the electrical source 160.

Although FIG. 3 illustrates the optical device with a stack of two compartments, an optical device with three or more compartments may be used.

Figure 4:
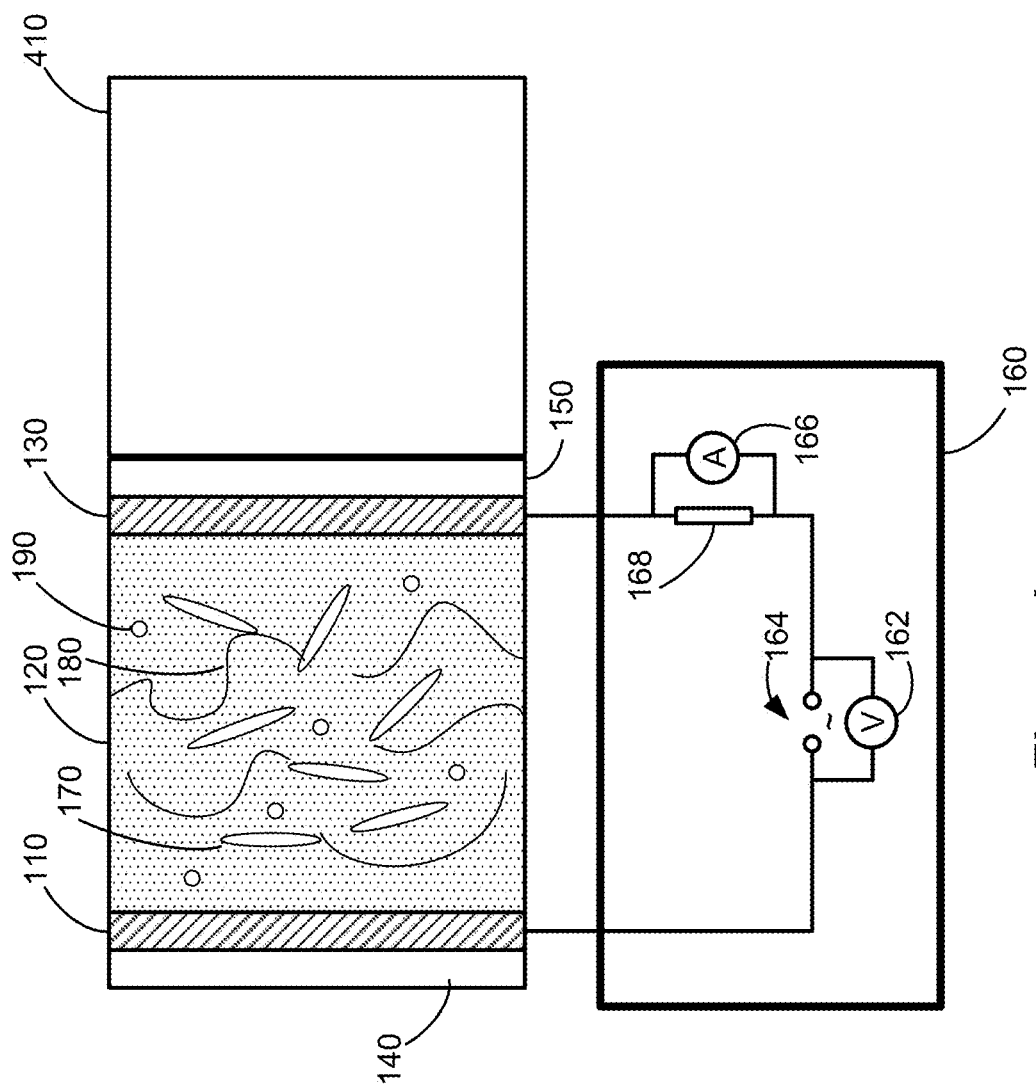
FIG. 4 is a schematic diagram illustrating an optical device in accordance with some embodiments.

FIG. 4 is a schematic diagram illustrating an optical device in accordance with some embodiments.

The optical device shown in FIG. 4 is similar to the optical device shown in FIGS. 1A and 1B, except that the optical device shown in FIG. 4 includes one or more optical devices 410 that do not include liquid crystal physical gel. For example, the one or more optical device 410 may include a dimming device that includes a photochromic material (e.g., a layer of photochromic material may be placed over the substrate 150).

In some embodiments, an optical device (e.g., 100) may be used in display devices such as head-mounted display devices. In some embodiments, an electro-optic device (e.g., 100) may be implemented as multifunctional optical components in near-eye displays for augmented reality ("AR"), virtual reality ("VR"), and/or mixed reality ("MR"). For example, the disclosed optical elements or devices may be implemented as optical dimming elements (e.g., variable intensity filters), etc., which may significantly reduce the weight and size, and enhance the optical performance of the head-mounted display devices. Exemplary embodiments of head-mounted display devices for implementing an electro-optic device (e.g., 100) are described with respect to FIGS. 5-7.

Figure 5:
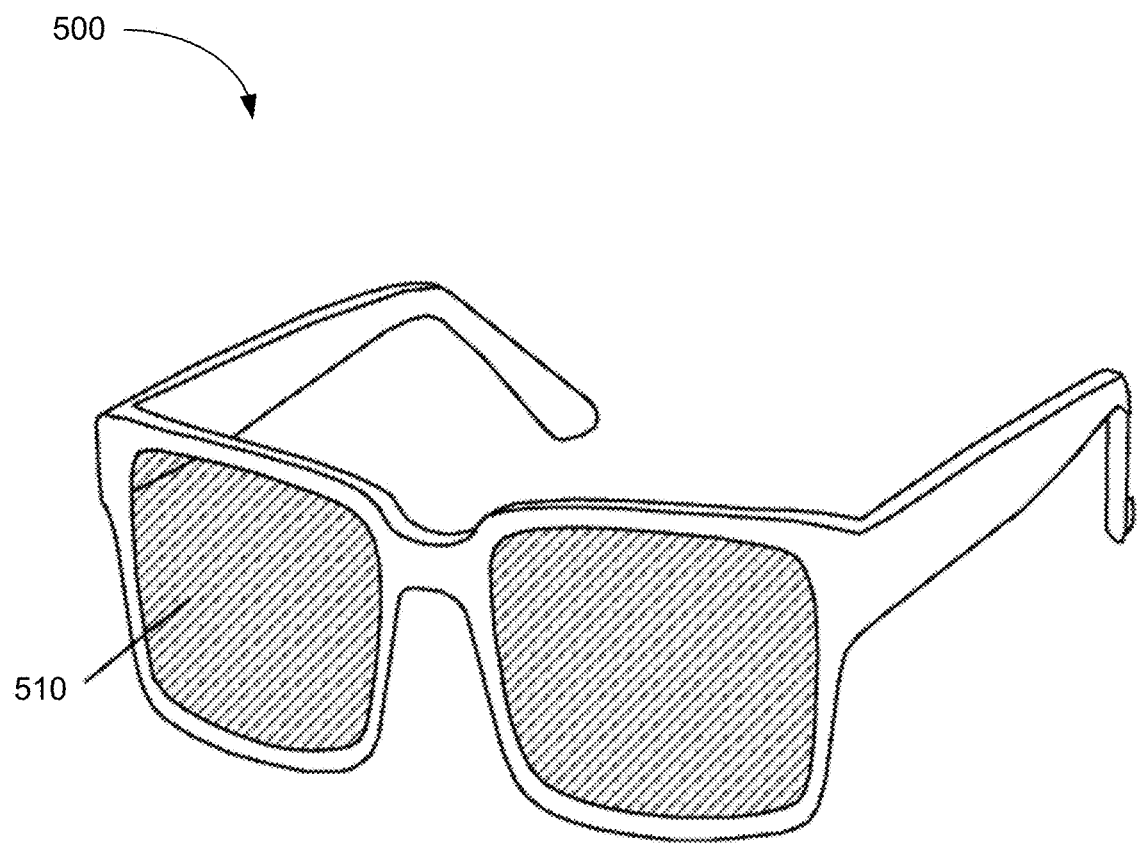
FIG. 5 is a perspective view of a display device in accordance with some embodiments.

FIG. 5 illustrates display device 500 in accordance with some embodiments. In some embodiments, display device 500 is configured to be worn on a head of a user (e.g., by having the form of spectacles or eyeglasses, as shown in FIG. 5) or to be included as part of a helmet that is to be worn by the user. When display device 500 is configured to be worn on a head of a user or to be included as part of a helmet, display device 500 is called a head-mounted display. Alternatively, display device 500 is configured for placement in proximity of an eye or eyes of the user at a fixed location, without being head-mounted (e.g., display device 500 is mounted in a vehicle, such as a car or an airplane, for placement in front of an eye or eyes of the user). As shown in FIG. 5, display device 500 includes display 510. Display 510 is configured for presenting visual contents (e.g., augmented reality contents, virtual reality contents, mixed reality contents, or any combination thereof) to a user.

Figure 6:
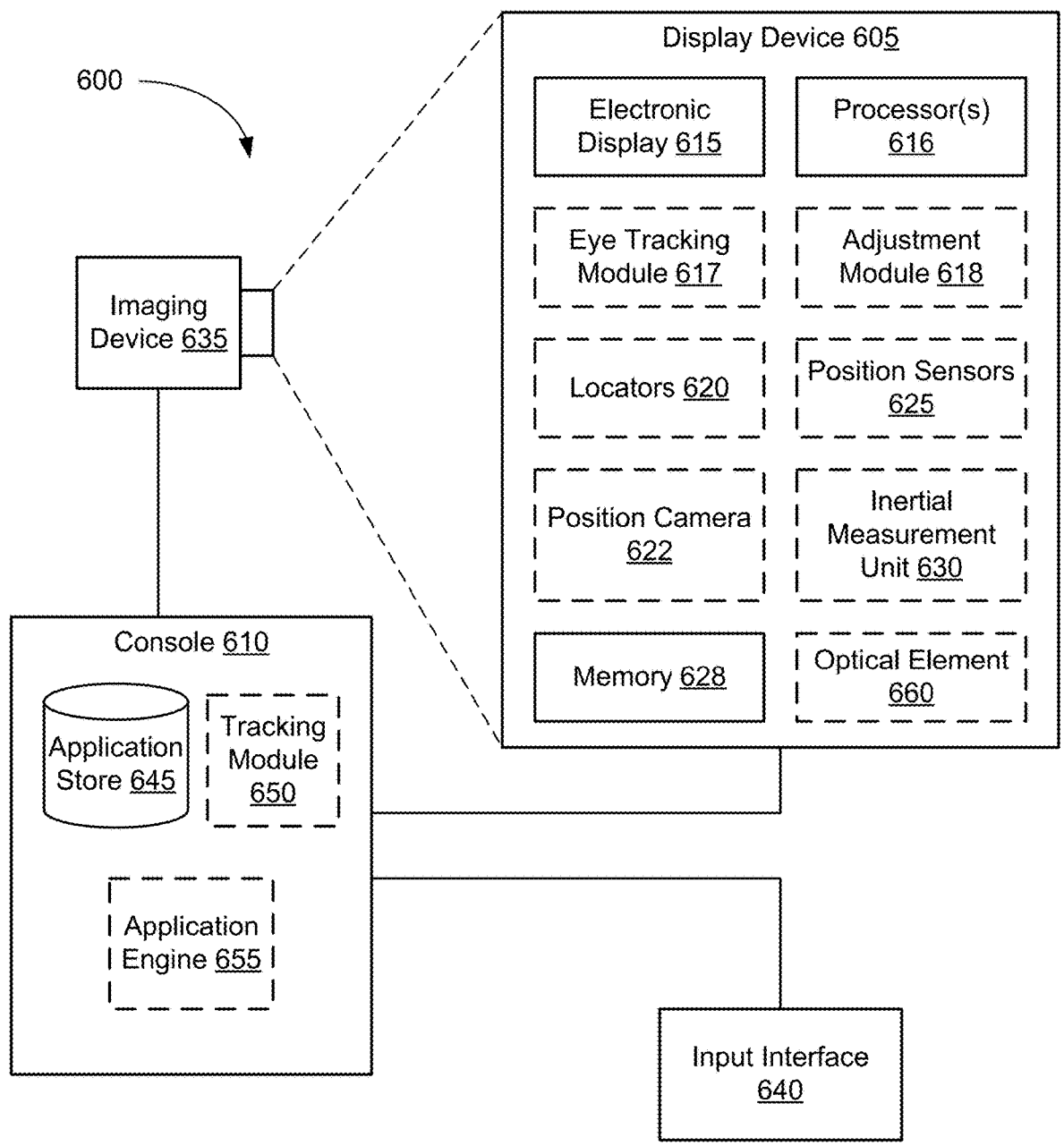
FIG. 6 is a block diagram of a system including a display device in accordance with some embodiments.

In some embodiments, display device 500 includes one or more components described herein with respect to FIG. 6. In some embodiments, display device 500 includes additional components not shown in FIG. 6.

FIG. 6 is a block diagram of system 600 in accordance with some embodiments. The system 600 shown in FIG. 6 includes display device 605 (which corresponds to display device 500 shown in FIG. 5), imaging device 635, and input interface 640 that are each coupled to console 610. While FIG. 6 shows an example of system 600 including one display device 605, imaging device 635, and input interface 640, in other embodiments, any number of these components may be included in system 600. For example, there may be multiple display devices 605 each having associated input interface 640 and being monitored by one or more imaging devices 635, with each display device 605, input interface 640, and imaging devices 635 communicating with console 610. In alternative configurations, different and/or additional components may be included in system 600. For example, in some embodiments, console 610 is connected via a network (e.g., the Internet or a wireless network) to system 600 or is self-contained as part of display device 605 (e.g., physically located inside display device 605). In some embodiments, display device 605 is used to create mixed reality by adding in a view of the real surroundings. Thus, display device 605 and system 600 described here can deliver augmented reality, virtual reality, and mixed reality.

In some embodiments, as shown in FIG. 5, display device 605 is a head-mounted display that presents media to a user. Examples of media presented by display device 605 include one or more images, video, audio, or some combination thereof. In some embodiments, audio is presented via an external device (e.g., speakers and/or headphones) that receives audio information from display device 605, console 610, or both, and presents audio data based on the audio information. In some embodiments, display device 605 immerses a user in an augmented environment.

In some embodiments, display device 605 also acts as an augmented reality (AR) headset. In these embodiments, display device 605 augments views of a physical, real-world environment with computer-generated elements (e.g., images, video, sound, etc.). Moreover, in some embodiments, display device 605 is able to cycle between different types of operation. Thus, display device 605 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 655.

Display device 605 includes electronic display 615, one or more processors 616, eye tracking module 617, adjustment module 618, one or more locators 620, one or more position sensors 625, one or more position cameras 622, memory 628, inertial measurement unit (IMU) 630, one or more optical elements 660 or a subset or superset thereof (e.g., display device 605 with electronic display 615, one or more processors 616, and memory 628, without any other listed components). Some embodiments of display device 605 have different modules than those described here. Similarly, the functions can be distributed among the modules in a different manner than is described here.

One or more processors 616 (e.g., processing units or cores) execute instructions stored in memory 628. Memory 628 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 628, or alternately the non-volatile memory device(s) within memory 628, includes a non-transitory computer readable storage medium. In some embodiments, memory 628 or the computer readable storage medium of memory 628 stores programs, modules and data structures, and/or instructions for displaying one or more images on electronic display 615.

Electronic display 615 displays images to the user in accordance with data received from console 610 and/or processor(s) 616. In various embodiments, electronic display 615 may comprise a single adjustable display element or multiple adjustable display elements (e.g., a display for each eye of a user). In some embodiments, electronic display 615 is configured to display images to the user by projecting the images onto one or more optical elements 660.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 615 projects images to one or more reflective elements 660, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 605 (e.g., a user wearing display device 605) for viewing images from display device 605. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed. As used herein, IR refers to light with wavelengths ranging from 700 nm to 1 mm including near infrared (NIR) ranging from 750 nm to 1500 nm.

Eye tracking module 617 determines locations of each pupil of a user's eyes. In some embodiments, eye tracking module 617 instructs electronic display 615 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 617 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 617 maps the locations of the user's pupil while looking at the reference points to corresponding signals received on the IR tracking array). As mentioned above, in some embodiments, system 600 may use other eye tracking systems than the embedded IR one described herein.

Adjustment module 618 generates an image frame based on the determined locations of the pupils. In some embodiments, this sends a discrete image to the display that will tile subimages together thus a coherent stitched image will appear on the back of the retina. Adjustment module 618 adjusts an output (i.e., the generated image frame) of electronic display 615 based on the detected locations of the pupils. Adjustment module 618 instructs portions of electronic display 615 to pass image light to the determined locations of the pupils. In some embodiments, adjustment module 618 also instructs the electronic display to not pass image light to positions other than the determined locations of the pupils. Adjustment module 618 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 620 are objects located in specific positions on display device 605 relative to one another and relative to a specific reference point on display device 605. A locator 620 may be a light emitting diode (LED), a corner cube reflector, a reflective marker, a type of light source that contrasts with an environment in which display device 605 operates, or some combination thereof. In embodiments where locators 620 are active (e.g., an LED or other type of light emitting device), locators 620 may emit light in the visible band (e.g., about 500 nm to 750 nm), in the infrared band (e.g., about 750 nm to 1 mm), in the ultraviolet band (about 100 nm to 500 nm), some other portion of the electromagnetic spectrum, or some combination thereof.

In some embodiments, locators 620 are located beneath an outer surface of display device 605, which is transparent to the wavelengths of light emitted or reflected by locators 620 or is thin enough to not substantially attenuate the wavelengths of light emitted or reflected by locators 620. Additionally, in some embodiments, the outer surface or other portions of display device 605 are opaque in the visible band of wavelengths of light. Thus, locators 620 may emit light in the IR band under an outer surface that is transparent in the IR band but opaque in the visible band.

IMU 630 is an electronic device that generates calibration data based on measurement signals received from one or more position sensors 625. Position sensor 625 generates one or more measurement signals in response to motion of display device 605. Examples of position sensors 625 include: one or more accelerometers, one or more gyroscopes, one or more magnetometers, another suitable type of sensor that detects motion, a type of sensor used for error correction of IMU 630, or some combination thereof. Position sensors 625 may be located external to IMU 630, internal to IMU 630, or some combination thereof.

Based on the one or more measurement signals from one or more position sensors 625, IMU 630 generates first calibration data indicating an estimated position of display device 605 relative to an initial position of display device 605. For example, position sensors 625 include multiple accelerometers to measure translational motion (forward/back, up/down, left/right) and multiple gyroscopes to measure rotational motion (e.g., pitch, yaw, roll). In some embodiments, IMU 630 rapidly samples the measurement signals and calculates the estimated position of display device 605 from the sampled data. For example, IMU 630 integrates the measurement signals received from the accelerometers over time to estimate a velocity vector and integrates the velocity vector over time to determine an estimated position of a reference point on display device 605. Alternatively, IMU 630 provides the sampled measurement signals to console 610, which determines the first calibration data. The reference point is a point that may be used to describe the position of display device 605. While the reference point may generally be defined as a point in space; however, in practice the reference point is defined as a point within display device 605 (e.g., a center of IMU 630).

In some embodiments, IMU 630 receives one or more calibration parameters from console 610. As further discussed below, the one or more calibration parameters are used to maintain tracking of display device 605. Based on a received calibration parameter, IMU 630 may adjust one or more IMU parameters (e.g., sample rate). In some embodiments, certain calibration parameters cause IMU 630 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 635 generates calibration data in accordance with calibration parameters received from console 610. Calibration data includes one or more images showing observed positions of locators 620 that are detectable by imaging device 635. In some embodiments, imaging device 635 includes one or more still cameras, one or more video cameras, any other device capable of capturing images including one or more locators 620, or some combination thereof. Additionally, imaging device 635 may include one or more filters (e.g., used to increase signal to noise ratio). Imaging device 635 is configured to optionally detect light emitted or reflected from locators 620 in a field of view of imaging device 635. In embodiments where locators 620 include passive elements (e.g., a retroreflector), imaging device 635 may include a light source that illuminates some or all of locators 620, which retro-reflect the light towards the light source in imaging device 635. Second calibration data is communicated from imaging device 635 to console 610, and imaging device 635 receives one or more calibration parameters from console 610 to adjust one or more imaging parameters (e.g., focal length, focus, frame rate, ISO, sensor temperature, shutter speed, aperture, etc.).

In some embodiments, display device 605 optionally includes one or more optical elements 660 (e.g., lenses, reflectors, gratings, etc.). In some embodiments, electronic display device 605 includes a single optical element 660 or multiple optical elements 660 (e.g., an optical element 660 for each eye of a user). In some embodiments, electronic display 615 projects computer-generated images on one or more optical elements 660, such as a reflective element, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more optical elements 660 are partially transparent (e.g., the one or more optical elements 660 have a transmittance of at least 15%, 20%, 25%, 30%, 35%, 50%, 55%, or 50%), which allows transmission of ambient light. In such embodiments, computer-generated images projected by electronic display 615 are superimposed with the transmitted ambient light (e.g., transmitted ambient image) to provide augmented reality images.

In some embodiments, one or more optical elements 660, or a subset there of, are positioned to modify light (e.g., ambient light) transmitted to electronic display 615. For example, the one or more optical elements 660 may include an optical dimmer to selectively reduce the intensity of light passing through the optical dimmer. In some embodiments, optical elements 660 include an electro-optic device (e.g., 100) described above with respect to FIGS. 1A-1B, 2A-2C, and 3-4.

Input interface 640 is a device that allows a user to send action requests to console 610. An action request is a request to perform a particular action. For example, an action request may be to start or end an application or to perform a particular action within the application. Input interface 640 may include one or more input devices. Example input devices include: a keyboard, a mouse, a game controller, data from brain signals, data from other parts of the human body, or any other suitable device for receiving action requests and communicating the received action requests to console 610. An action request received by input interface 640 is communicated to console 610, which performs an action corresponding to the action request. In some embodiments, input interface 640 may provide haptic feedback to the user in accordance with instructions received from console 610. For example, haptic feedback is provided when an action request is received, or console 610 communicates instructions to input interface 640 causing input interface 640 to generate haptic feedback when console 610 performs an action.

Console 610 provides media to display device 605 for presentation to the user in accordance with information received from one or more of: imaging device 635, display device 605, and input interface 640. In the example shown in FIG. 6, console 610 includes application store 645, tracking module 650, and application engine 655. Some embodiments of console 610 have different modules than those described in conjunction with FIG. 6. Similarly, the functions further described herein may be distributed among components of console 610 in a different manner than is described here.

When application store 645 is included in console 610, application store 645 stores one or more applications for execution by console 610. An application is a group of instructions, that when executed by a processor, is used for generating content for presentation to the user. Content generated by the processor based on an application may be in response to inputs received from the user via movement of display device 605 or input interface 640. Examples of applications include: gaming applications, conferencing applications, video playback application, or other suitable applications.

When tracking module 650 is included in console 610, tracking module 650 calibrates system 600 using one or more calibration parameters and may adjust one or more calibration parameters to reduce error in determination of the position of display device 605. For example, tracking module 650 adjusts the focus of imaging device 635 to obtain a more accurate position for observed locators on display device 605. Moreover, calibration performed by tracking module 650 also accounts for information received from IMU 630. Additionally, if tracking of display device 605 is lost (e.g., imaging device 635 loses line of sight of at least a threshold number of locators 620), tracking module 650 re-calibrates some or all of system 600.

In some embodiments, tracking module 650 tracks movements of display device 605 using second calibration data from imaging device 635. For example, tracking module 650 determines positions of a reference point of display device 605 using observed locators from the second calibration data and a model of display device 605. In some embodiments, tracking module 650 also determines positions of a reference point of display device 605 using position information from the first calibration data. Additionally, in some embodiments, tracking module 650 may use portions of the first calibration data, the second calibration data, or some combination thereof, to predict a future location of display device 605. Tracking module 650 provides the estimated or predicted future position of display device 605 to application engine 655.

Application engine 655 executes applications within system 600 and receives position information, acceleration information, velocity information, predicted future positions, or some combination thereof of display device 605 from tracking module 650. Based on the received information, application engine 655 determines content to provide to display device 605 for presentation to the user. For example, if the received information indicates that the user has looked to the left, application engine 655 generates content for display device 605 that mirrors the user's movement in an augmented environment. Additionally, application engine 655 performs an action within an application executing on console 610 in response to an action request received from input interface 640 and provides feedback to the user that the action was performed. The provided feedback may be visual or audible feedback via display device 605 or haptic feedback via input interface 640.

FIG. 7 is an isometric view of display device 700 in accordance with some embodiments. In some other embodiments, display device 700 is part of some other electronic display (e.g., a digital microscope, a head-mounted display device, etc.). In some embodiments, display device 700 includes light emission device 710 (e.g., a light emission device array) and an optical assembly 730, which may include one or more lenses and/or other optical components. In some embodiments, display device 700 also includes an IR detector array.

Light emission device 710 emits image light and optional IR light toward the viewing user. Light emission device 710 includes one or more light emission components that emit light in the visible light (and optionally includes components that emit light in the IR). Light emission device 710 may include, e.g., an array of LEDs, an array of microLEDs, an array of organic LEDs (OLEDs), an array of superluminescent LEDs (sLEDS) or some combination thereof.

In some embodiments, light emission device 710 includes an emission intensity array (e.g., a spatial light modulator) configured to selectively attenuate light emitted from light emission device 710. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is transmitted. In some embodiments, display device 700 uses the emission intensity array to facilitate providing image light to a location of pupil 750 of eye 740 of a user, and minimize the amount of image light provided to other areas in the eyebox. In some embodiments, display device 700 includes, or is optically coupled with, electro-optic devices operating as a display resolution enhancement component. In some embodiments, display device 700 is an augmented reality display device. In such embodiments, display device 700 includes, or is optically coupled with, electro-optic devices operating as a waveguide-based combiner or as a polarization selective reflector.

In some embodiments, the display device 700 includes one or more lenses. The one or more lenses receive modified image light (e.g., attenuated light) from light emission device 710, and direct the modified image light to a location of pupil 750. The optical assembly may include additional optical components, such as color filters, mirrors, etc.

In some embodiments, the optical assembly 730 includes an electro-optic device (e.g., 100) described above with respect to FIGS. 1A-1B, 2A-2C, and 3-4. The electro-optic device 100 has a variable transmittance (e.g., has a first transmittance curve at a first time and a second transmittance curve distinct from the first transmittance curve at a second time mutually exclusive from the first time). The electro-optic device 100 conditionally reduces intensity of light passing through the electro-optic device 100. In some embodiments, the electro-optic device 100 has only a single window that has a uniform transmittance across the window at each time (e.g., the electro-optic device 100 operates as a single variable intensity filter). In some embodiments, the electro-optic device 100 has a plurality of regions, as shown in FIG. 7, where each region may have a transmittance independent of transmittances of other regions. For example, the electro-optic device 100 may include an array of the structure shown in FIG. 1.

An optional IR detector array detects IR light that has been retro-reflected from the retina of eye 740, a cornea of eye 740, a crystalline lens of eye 740, or some combination thereof. The IR detector array includes either a single IR sensor or a plurality of IR sensitive detectors (e.g., photodiodes). In some embodiments, the IR detector array is separate from light emission device 710. In some embodiments, the IR detector array is integrated into light emission device 710.

In some embodiments, light emission device 710 including an emission intensity array make up a display element. Alternatively, the display element includes light emission device 710 (e.g., when light emission device 710 includes individually adjustable pixels) without the emission intensity array. In some embodiments, the display element additionally includes the IR array. In some embodiments, in response to a determined location of pupil 750, the display element adjusts the emitted image light such that the light output by the display element is refracted by one or more lenses toward the determined location of pupil 750, and not toward other locations in the eyebox.

In some embodiments, display device 700 includes one or more broadband sources (e.g., one or more white LEDs) coupled with a plurality of color filters, in addition to, or instead of, light emission device 710.

In light of these principles, we now turn to certain embodiments.

In accordance with some embodiments, an optical device includes a first set of one or more electrodes (e.g., a single electrode 110 shown in FIG. 2C or a plurality of electrodes 110-1 and 110-2 shown in FIG. 2A or 3); a second set of one or more electrodes (e.g., a single electrode 130 shown in FIG. 2A or 4 or a plurality of electrodes 130-1 and 130-2 shown in FIG. 2B) distinct and separate from the first set of one or more electrodes; and a medium (e.g., medium 120) that includes liquid crystal physical gel. The medium is located between the first set of one or more electrodes and the second set of one or more electrodes.

In some embodiments, the optical device further includes a first substrate (e.g., substrate 140) on which the first set of one or more electrodes is located; and a second substrate (e.g., substrate 150) on which the second set of one or more electrodes is located, the second substrate being distinct and separate from the first substrate.

In some embodiments, the first set of one or more electrodes is positioned on the first substrate facing toward the second set of one or more electrodes; and the second set of one or more electrodes is positioned on the second substrate facing toward the first set of one or more electrodes (e.g., FIGS. 1A and 1B).

In some embodiments, the first set of one or more electrodes consists of a single electrode (e.g., a single electrode 110 shown in FIG. 2C).

In some embodiments, the second set of one or more electrodes consists of a single electrode (e.g., a single electrode 130 shown in FIG. 2A or 4).

In some embodiments, the second set of one or more electrodes includes a plurality of pixelated electrodes (e.g., a plurality of electrodes 130-1 and 130-2 shown in FIG. 2B).

In some embodiments, the first set of one or more electrodes includes a plurality of pixelated electrodes (e.g., a plurality of electrodes 110-1 and 110-2 shown in FIG. 2A or 3).

In some embodiments, the second set of one or more electrodes consists of a single electrode (e.g., a single electrode 130 shown in FIG. 2A or 4).

In some embodiments, the second set of one or more electrodes includes a plurality of pixelated electrodes (e.g., a plurality of electrodes 130-1 and 130-2 shown in FIG. 2B).

In some embodiments, the liquid crystal physical gel includes liquid crystals.

In some embodiments, the liquid crystal physical gel includes a gelator selected from a group consisting of: cholesteryl stearate, polyfluorene-based polymer, a combination of a fatty acid and mesogen monomer, or a side-chain liquid crystalline polymer.

In some embodiments, a concentration of the gelator is less than 2% weight. In some embodiments, the concentration of the gelator is 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, or within an interval between any two of the afore-mentioned values. The low concentration of the gelator facilitate reduction of the voltage required for switching the optical device between clear and dark states. For example, for electrodes separated by 15 µm, only 0.81 V driving voltage is necessary for switching between the clear and dark states (corresponding to an electric field of 0.054 V/µm). The low concentration of the gelator also reduces the haze in the optical device.

In some embodiments, one or more electronic controllers for providing a first set of electrical inputs to the first set of one or more electrodes and the second set of one or more electrodes at a first time (e.g., FIG. 1A) and a second set of electrical inputs to the first set of one or more electrodes and the second set of one or more electrodes at a second time distinct from the first time (e.g., FIG. 1B) so that the optical device has a first transmission pattern at the first time and a second transmission pattern distinct from the first transmission pattern at the second time.

In some embodiments, the medium is included in a stack of two or more distinct compartments (e.g., FIG. 3). A first compartment of the stack of two or more distinct compartments is positioned adjacent to the first set of one or more electrodes. A second compartment of the stack of two or more distinct compartments is positioned adjacent to the second set of one or more electrodes.

In some embodiments, the optical device includes one or more optical devices that do not include liquid crystal physical gel (e.g., a photochromic dimming device, an electrochromic dimming device, a thermochromic dimming device, etc.)(e.g., FIG. 4).

In some embodiments, the liquid crystal physical gel includes one or more dyes.

In accordance with some embodiments, a display device includes one or more display panels; and any optical device described herein (e.g., FIG. 7). In some embodiments, the optical device is positioned to receive light and conditionally provide at least a portion of the light to the one or more display panels.

In accordance with some embodiments, a method includes providing a first set of electrical inputs to the first set of one or more electrodes and the second set of one or more electrodes of any optical device described herein at a first time so that the optical device has a first transmission pattern (e.g., FIG. 1A); and providing a second set of electrical inputs to the first set of one or more electrodes and the second set of one or more electrodes at a second time distinct from the first time so that the optical device has a second transmission pattern distinct from the first transmission pattern (e.g., FIG. 1B).

In some embodiments, the first transmission pattern has a higher optical transmittance than the second transmission pattern.

In some embodiments, the first set of electrical inputs has a higher voltage than the second set of electrical inputs.

In some embodiments, the first set of electrical inputs has a characteristic voltage less than 1 V. In some embodiments, the first set of electrical inputs has a characteristic voltage of 0.1 V, 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, or within an interval between any two of the aforementioned values.

In some embodiments, the first set of electrical inputs is characterized by an electrical field less than 0.1 V/µm. In some embodiments, the first set of electrical inputs has a characteristic voltage (e.g., a highest voltage or an average voltage) of 0.055 V/µm, 0.06 V/µm, 0.07 V/µm, 0.08 V/µm, 0.09 V/µm, 0.10 V/µm, 0.11 V/µm, 0.12 V/µm, 0.13 V/µm, 0.14 V/µm, 0.15 V/µm, 0.16 V/µm, 0.17 V/µm, 0.18 V/µm, 0.19 V/µm, 0.2 V/µm, 0.3 V/µm, 0.4 V/µm, 0.5 V/µm, 0.6 V/µm, or within an interval between any two of the aforementioned values.

In some embodiments, the first set of electrical inputs is characterized by an electrical field less than 0.1 V/µm; and the second set of electrical inputs is characterized by an electrical field (e.g., a highest electrical field) less than 0.1 V/µm. In some embodiments, the first set of electrical inputs has a characteristic voltage of 0.055 V/µm, 0.06 V/µm, 0.07 V/µm, 0.08 V/µm, 0.09 V/µm, 0.10 V/µm, 0.11 V/µm, 0.12 V/µm, 0.13 V/µm, 0.14 V/µm, 0.15 V/µm, 0.16 V/µm, 0.17 V/µm, 0.18 V/µm, 0.19 V/µm, 0.2 V/µm, 0.3 V/µm, 0.4 V/µm, 0.5 V/µm, 0.6 V/µm, or within an interval between any two of the aforementioned values. In some embodiments, the second set of electrical inputs has a characteristic voltage of 0.055 V/µm, 0.06 V/µm, 0.07 V/µm, 0.08 V/µm, 0.09 V/µm, 0.10 V/µm, 0.11 V/µm, 0.12 V/µm, 0.13 V/µm, 0.14 V/µm, 0.15 V/µm, 0.16 V/µm, 0.17 V/µm, 0.18 V/µm, 0.19 V/µm, 0.2 V/µm, 0.3 V/µm, 0.4 V/µm, 0.5 V/µm, 0.6 V/µm, or within an interval between any two of the aforementioned values.

Although head-mounted displays are illustrated as apparatus that include the described electro-optic devices, such electro-optic devices may be used in other systems, devices, and apparatus. For example, the electro-optic devices described herein may be used as smart windows (for buildings or vehicles) or switchable shutters.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical device, comprising:
a first set of one or more electrodes;
a second set of one or more electrodes distinct and separate from the first set of one or more electrodes; and
a medium that includes liquid crystal physical gel, wherein the medium is located between the first set of one or more electrodes and the second set of one or more electrodes and the liquid crystal physical gel includes liquid crystals and a gelator selected from a group consisting of: cholesteryl stearate, a combination of a fatty acid and mesogen monomer, or a side-chain liquid crystalline polymer.

2. The optical device of claim 1, further comprising:
a first substrate on which the first set of one or more electrodes is located; and
a second substrate on which the second set of one or more electrodes is located, the second substrate being distinct and separate from the first substrate.

3. The optical device of claim 2, wherein:
the first set of one or more electrodes is positioned on the first substrate facing toward the second set of one or more electrodes; and
the second set of one or more electrodes is positioned on the second substrate facing toward the first set of one or more electrodes.

4. The optical device of claim 1, wherein:
the first set of one or more electrodes consists of a single electrode.

5. The optical device of claim 4, wherein:
the second set of one or more electrodes consists of a single electrode.

6. The optical device of claim 4, wherein:
the second set of one or more electrodes includes a plurality of pixelated electrodes.

7. The optical device of claim 1, wherein:
the first set of one or more electrodes includes a plurality of pixelated electrodes.

8. The optical device of claim 7, wherein:
the second set of one or more electrodes consists of a single electrode.

9. The optical device of claim 8, wherein:
the second set of one or more electrodes includes a plurality of pixelated electrodes.

10. The optical device of claim 1, wherein:
a concentration of the gelator is less than 2% weight.

11. The optical device of claim 1, wherein:
one or more electronic controllers for providing a first set of electrical inputs to the first set of one or more electrodes and the second set of one or more electrodes at a first time and a second set of electrical inputs to the first set of one or more electrodes and the second set of one or more electrodes at a second time distinct from the first time so that the optical device has a first transmission pattern at the first time and a second transmission pattern distinct from the first transmission pattern at the second time.

12. The optical device of claim 1, wherein:
the medium is included in a stack of two or more distinct compartments;
a first compartment of the stack of two or more distinct compartments is positioned adjacent to the first set of one or more electrodes; and
a second compartment of the stack of two or more distinct compartments is positioned adjacent to the second set of one or more electrodes.

13. The optical device of claim 1, wherein:
the liquid crystal physical gel includes one or more dyes.

14. A display device, comprising:
one or more display panels; and
the optical device of claim 1 positioned to receive light and conditionally provide at least a portion of the light to the one or more display panels.

15. A method, comprising:
providing a first set of electrical inputs to a first set of one or more electrodes and a second set of one or more electrodes, distinct and separate from the first set of one or more electrodes, of an optical device at a first time so that the optical device has a first transmission pattern, wherein the optical device includes a medium that includes liquid crystal physical gel, wherein the medium is located between the first set of one or more electrodes and the second set of one or more electrodes, and the first set of electrical inputs is characterized by an electrical field less than 0.1 V/μm; and
providing a second set of electrical inputs to the first set of one or more electrodes and the second set of one or more electrodes at a second time distinct from the first time so that the optical device has a second transmission pattern distinct from the first transmission pattern, wherein the liquid crystal physical gel includes a gelator selected from a group consisting of: cholesteryl stearate, a combination of a fatty acid and mesogen monomer, or a side-chain liquid crystalline polymer.

16. The method of claim 15, wherein:
the first transmission pattern has a higher optical transmittance than the second transmission pattern.

17. The method of claim 15, wherein:
the first set of electrical inputs has a higher voltage than the second set of electrical inputs.

* * * * *